United States Patent [19]

Suzuki et al.

[11] Patent Number: 5,718,748
[45] Date of Patent: Feb. 17, 1998

[54] EMULSION INK FOR STENCIL PRINTING

[75] Inventors: Takashi Suzuki; Masato Ishikawa; Yoshihiro Hayashi; Sadanao Okuda, all of Ibaraki-ken, Japan

[73] Assignee: Riso Kagaku Corporation, Tokyo, Japan

[21] Appl. No.: 785,834

[22] Filed: Jan. 15, 1997

[30] Foreign Application Priority Data

Jan. 26, 1996 [JP] Japan .................... 8-032763
Jul. 12, 1996 [JP] Japan .................... 8-203224

[51] Int. Cl.⁶ .................................. C09D 11/02
[52] U.S. Cl. ....................... 106/31.26; 106/31.6
[58] Field of Search .................. 106/20 R, 20 C, 106/30 R, 27 R, 27 A, 31.26, 31.6

[56] References Cited

U.S. PATENT DOCUMENTS

| | | | |
|---|---|---|---|
| 2,839,412 | 6/1958 | Igler et al. | 106/28 A |
| 3,823,020 | 7/1974 | Gilson et al. | 106/30 B |
| 5,389,130 | 2/1995 | Batlaw et al. | 106/28 R |
| 5,395,435 | 3/1995 | Mizobuchi | 106/28 R |
| 5,573,578 | 11/1996 | Okuda | 106/27 R |
| 5,575,839 | 11/1996 | Okuda | 106/20 R |
| 5,637,137 | 6/1997 | Okuda | 106/31.26 |

FOREIGN PATENT DOCUMENTS

| | | |
|---|---|---|
| 0 726 300 | 8/1996 | European Pat. Off. . |
| 0 778 323 | 6/1997 | European Pat. Off. . |
| 61-255967 | 11/1986 | Japan . |
| 1-14284 | 1/1989 | Japan . |
| 4-132777 | 5/1992 | Japan . |
| 5-117565 | 5/1993 | Japan . |
| 7-188598 | 7/1995 | Japan . |

*Primary Examiner*—Helene Klemanski
*Attorney, Agent, or Firm*—Cushman Darby & Cushman IP Group of Pillsbury Madison & Sutro, LLP

[57] ABSTRACT

An water-in-oil (W/O) emulsion ink for stencil printing is provided, which is excellent in emulsion stability and drying, high in printing density and low in blurring and seep through. The W/O emulsion ink has an oil phase and a water phase, in which a water-insoluble colorant is contained in said water phase, and said oil phase comprises a solvent and an agent for thickening said solvent. The oil phase preferably has a viscosity at 23° C. of 5–20,000 cps, more preferably 15–2,000 cps. The thickening agent may be a resin in an amount of 1–30%, preferably 2–25% by weight of the total of the ink, or may be oil-insoluble particulates or powders in an amount of 0.01–10%, preferably 0.1–5% by weight of the total of the ink.

20 Claims, No Drawings

EMULSION INK FOR STENCIL PRINTING

The present invention relates to an emulsion ink for stencil printing, and more specifically relates to an emulsion ink which is excellent in emulsion stability and drying, high in printing density and low in blurring and seep through.

Stencil printing is effected by perforating a stencil sheet to make a master, and passing inks through the perforated portions of the master to an article to be printed such as printing paper. Since the master is easy to make, stencil printing is utilized in a wide range of fields.

Conventional emulsion inks for stencil printing are usually water-in-oil (W/O) emulsion inks which contain pigments as colorants in the oil phase thereof, as disclosed in Japanese Patent Laid-open (Kokai) Nos. 255967/86, 14284/89, 132777/92 and 117565/93. Once this type of W/O emulsion inks are printed on an article such as printing paper to be printed, the oil phase, which is the outer phase of emulsion, first permeates the printed article, and then the water phase, which is the inner phase of emulsion, permeates the printed article and/or evaporates therefrom. Since the conventional W/O emulsion inks contain pigments in the oil phase, the inks are low in permeation speed. In addition, permeation of pigments contained in the oil phase occurs concurrently with the permeation of the oil phase, and as a result, the inks often have a problem on seep through because pigments deeply permeate into the printed article. Similarly, this phenomenon of permeation occurs on a surface of paper, causing inks to spread on the surface of the paper and blurring the printing.

In order to overcome such disadvantages as mentioned above, a W/O emulsion ink has been suggested, which contains a water-insoluble colorant in the water phase thereof, as disclosed in Japanese Patent Laid-open (Kokai) No. 188598/95. In this case, in order to maintain the water-insoluble colorant to be dispersed in the water phase and keep the emulsion stable, average particle size of the water-insoluble colorant is reduced, and a dispersant is added to improve wettability and dispersibility of the water-insoluble colorant in water. However, when the dispersant is present in water, the W/O emulsion tends to lack long-term stability.

It is an object of the present invention to overcome the above-mentioned problems of prior art, and provide an emulsion ink for stencil printing, which is improved in emulsion stability and drying, high in printing density, and low in blurring and seep through.

According to the present invention, the above object is attained by a water-in-oil (W/O) emulsion ink for stencil printing, having an oil phase and a water phase, in which water insoluble colorants are contained in the water phase, and the oil phase comprises a solvent and an agent for thickening the solvent.

The present emulsion ink contains an agent for thickening a solvent in the oil phase and thus is improved in emulsion stability. This is because emulsion stability is considered to be influenced by viscosity of the oil phase. In other words, it is assumed that when the viscosity of the oil phase is increased, water particles, which are the inside phase of the emulsion, become difficult to aggregate and thus the emulsion is improved in stability.

In the present invention, the oil phase preferably has a viscosity of 5–20,000 cps at 23° C., more preferably 15–2,000 cps at 23° C. When the viscosity is lower than 5 cps, the emulsion ink also becomes low in viscosity, causing much blurring, and in this case little effect is expected from water-insoluble colorants contained in the water phase. When the viscosity is higher than 20,000 cps, the ink lacks fluidity and is no longer suitable for stencil printing because it can hardly pass through perforated portions of stencil sheets and cannot provide sufficient printing density.

In the present emulsion ink, the oil phase, namely the outer phase, is greater in permeability and lower in surface tension than the water phase, and thus the oil phase permeates into an article to be printed earlier than the water phase, and then the water phase permeates and/or evaporates. Since the water phase can hardly permeate into the inside of the article into which the oil phase has permeated, the water phase remains on the surface of the article and is dried thereon. As a result, printing density is improved, and seep through, blurring and the like of the ink are prevented. While conventional emulsion inks containing water-insoluble colorants in the oil phase were low in permeation speed of the oil phase and took much time to permeate and dry, the present emulsion ink is fast in permeation of the oil phase and thus improved in drying.

In the present emulsion ink, the oil phase basically comprises a solvent to which the thickening agent and an emulsifier are added. The thickening agent may be resins or oil-insoluble particulates or powders, but is not limited thereto.

Resins are generally composed of polymer materials, and thus when resins are contained in the oil phase, the oil phase is increased in viscosity. Furthermore, resins contained in the oil phase can usually improve solubility of the emulsifier in the solvent, and thus are also considered to contribute to stabilization of the emulsion to this effect. Such resins include phenolic resin, maleic resin, petroleum resin, rubber derivative resin, alkyd resin, these resins modified with fatty acids, and the like. Kinds and amount of resins to be added to attain a predetermined viscosity of the oil phase would be suitably selected by the skilled in the art. Generally, these resins may be added to the oil phase in an amount of 1–30% by weight, preferably 2–25% by weight based on the total of the emulsion ink.

Oil-insoluble particulates or powders can also increase viscosity of the oil phase when they are contained in the oil phase. Such particulates or powders include inorganic fine particles such as of terra abla, talc, clay, diatomaceous earth, calcium carbonate, barium sulfate, titanium oxide, alumina white, silica, kaolin, mica and aluminum hydroxide, organic fine particles such as of polyacrylate, polyurethane, polyester, polyethylene, polypropylene, polyvinyl chloride, polyvinylidene chloride, polystyrene, polysiloxane, phenolic resin, epoxy resin, benzoguanamine resin and copolymers thereof. Kinds and amount of said particulates or powders to be added to attain a predetermined viscosity of the oil phase would be suitably selected by the skilled in the art. Generally, these particulates or powders may be added to the oil phase in an amount of 0.01–10% by weight, preferably 0.1–5% by weight based on the total of the emulsion ink.

As indicated above, a small addition amount of said oil-insoluble particulates or powders can highly increase the viscosity of the oil phase. However, if they are used in a large amount, they tend to be left on the vicinity of the printed surface of porous articles such printing paper and close pores of the porous articles, thereby retarding permeation of the ink. Therefore, resins are preferred as thickening agents since they do not inhibit permeation of the ink. The thickening agent may be a combination of said resins and said oil-insoluble particulates or powders.

As a solvent, may be used a non-volatile solvent and/or a volatile solvent. As the non-volatile solvent, can be used mineral oils such as motor oils, spindle oils, machine oils and liquid paraffin, and vegetable oils such as olive oil, castor oil and salad oils. As the volatile solvent, can be used known solvents of the types of mineral oils and vegetable oils. Proportion of non-volatile solvent to volatile solvent (i.e., non-volatile solvent/volatile solvent) varies depending upon blending ratio of the oil phase and the water phase, but can generally be 0–95/100–5 on weight basis. In other words, the proportion may be 50–95/50–5 where the non-volatile solvent constitutes half or more of the solvent, or the proportion may be 0–50/100–50 where the non-volatile solvent constitutes less than half of the solvent.

The emulsifier is used to form the W/O emulsion, and is preferably a nonionic surfactant. As such a nonionic surfactant, mention may be made of sorbitan higher-fatty acid esters such as sorbitan monolaurate, sorbitan monopalmitate, sorbitan monostearate, sorbitan tristearate, sorbitan monooleate and sorbitan sesquioleate as well as fatty acid monoglycerides such as oleic acid monoglyceride, fatty acid diglycerides such as oleic acid diglyceride, and ethylene oxide adducts of higher alcohols, alkylphenols, fatty acids or the like.

In the present emulsion ink, the water phase basically comprises water and a water-insoluble colorant dispersed in water. The water-insoluble colorant used in the present invention is not specifically limited, but may be a known pigment and the like. Examples of the water-insoluble colorant for use in monochrome inks are carbon blacks such as furnace carbon black, lampblack, acetylene black and channel black, metals and metal oxides such as copper, iron, titanium oxide and calcium carbonate, and organic colorants such as ortho-nitroaniline black. Examples of the water-insoluble colorant for use in color inks are cyanine pigments such as phthalocyanine blue, and azo pigments such as soluble or insoluble azo pigments as well as organic pigments such as lake pigments, dioxazines, isoindolinone, quinacridone, and other various colorants commonly used.

Average particle size of the water-insoluble colorant is preferably 10 μm or less, more preferably 3 μm or less, and most preferably 0.5 μm or less. When the average particle size exceeds 10 μm, the W/O emulsion of the ink tends to be destructed. Addition amount of the water-insoluble colorant is preferably 1–30% by weight, more preferably 3–10% by weight based on the total of the emulsion ink.

In the present invention, the water phase may further comprise an oil-in-water (O/W) emulsion of resin and/or a water soluble resin. By adding these components to the water phase, fixation of the water-insoluble colorant to articles to be printed such as paper can be improved.

Examples of the O/W emulsion of resin include emulsions of resins such as polyvinyl acetate, copolymers of ethylene and vinyl acetate, copolymers of vinyl acetate and acrylic acid esters, polymethacrylic acid esters, polystyrene, copolymers of styrene and acrylic acid esters, styrene-butadiene copolymers, copolymers of vinylidene chloride and acrylic acid esters, polyvinyl chloride, copolymers of vinyl chloride and vinyl acetate, and polyurethane.

Examples of the water soluble resin include polyvinyl alcohol, methyl cellulose, carboxymethyl cellulose, hydroxyethyl cellulose, polyvinyl pyrrolidone, copolymers of polyethylene and polyvinyl alcohol, polyethylene oxide, polyvinyl ether, polyacrylamide, gum arabic, starch, and water-soluble polyurethane.

Addition amount of the O/W emulsion of resin and/or the water-soluble resin is preferably 20% by weight or less, more preferably 10% by weight or less as solid content based on the total weight of the ink. If it exceeds 20% by weight, inks form a film on perforations of a stencil sheet and become difficult to pass the perforations when inks are left on the stencil sheet for a long time.

Further, the water phase may contain, as dispersants, ionic surfactants, amphoteric surfactants, nonionic surfactants, polymeric, silicone-containing or fluorinated surfactants, or tertiary amine compounds or acid anhydride containing water-soluble polymers, in order to improve wetting, dispersion and the like of the water-insoluble colorant in water.

Among these dispersants, tertiary amine compounds and acid anhydride containing water-soluble polymers are particularly preferred. By employing these compounds as a dispersant, the water-insoluble colorant can finely and stably be dispersed in water, highly-improved images can be provided by virtue of the fine dispersion of the water-insoluble colorant, and a W/O emulsion ink excellent in emulsion stability can be obtained. When ordinary dispersants which are polymer compounds containing in molecule such functional groups as carboxyl or sulfonic acid groups that adsorb the surface of pigments, are used, the emulsion sometimes tends to be destructed. This is because such polymer compounds would also adsorb the interface between the oil phase and the water phase to deteriorate stability of the emulsion.

The tertiary amine compound is a compound having in molecule at least one linkage shown in formula (1):

and includes a polymer compound having a tertiary amine shown by —HC$_3$ group. Concrete examples of the tertiary amine compound are polyvinyl pyrrolidone shown in formula (2):

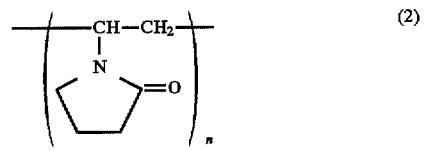

polyethyleneimine shown in formula (3):

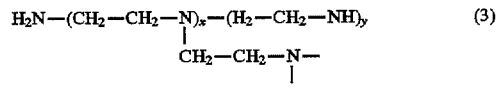

alkylolamine salts shown in formula (4):

wherein $R_1$, $R_2$ and $R_3$ are alkyl groups which may be the same or different, and H may be a metallic ion, and poly-N-acryloylpyrrolidine shown in formula (5):

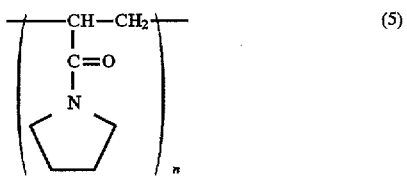

The acid anhydride containing water-soluble polymer is a compound having in molecule at least one group shown in formula (6):

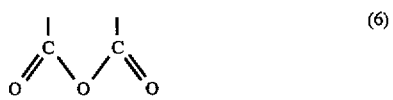

or salt or ester thereof, and can be selected from the group consisting of, for example, acid anhydride containing olefin copolymers, acid anhydride containing vinyl copolymers, and salts and esters thereof. The acid anhydride containing olefin copolymers include copolymers of olefins such as ethylene and isobutylene with ethylenically unsaturated monomers containing acid anhydrides such as maleic anhydride. The acid anhydride containing vinyl copolymers include copolymers of aromatic vinyl monomers, vinyl ester monomers or vinyl ether monomers with ethylenically unsaturated monomers containing acid anhydrides such as maleic anhydride. As aromatic vinyl monomers, mention may be made of styrene, α-methylstyrene, p-methylstyrene, vinyltoluene, p-butylstyrene, vinylnaphthalene, vinylanthracene, p-arylsulfoxyaminostyrene and p-styrenesulfonic acid and the like. As vinyl ester monomers, mention may be made of vinyl acetate, acrylic acid, acrylic acid ester, methacrylic acid ester and the like. As vinyl ether monomers, mention may be made of methylvinylether and the like. Among them, preferred acid anhydride containing olefin copolymers are isobutylene-maleic anhydride copolymers shown in formula (7):

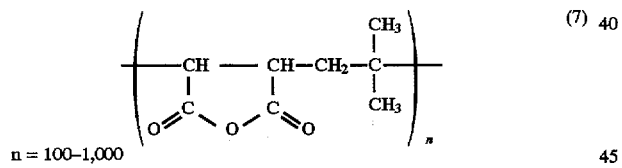

n = 100–1,000 and preferred acid anhydride containing vinyl copolymers are styrene-maleic anhydride copolymers shown in formula (8):

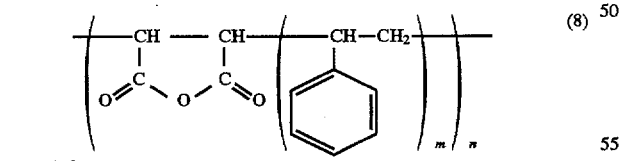

m = 1–3
n = 6–8

Some of the above mentioned acid anhydride containing water-soluble polymers require addition of alkali neutralizing agents when they are dissolved in water. However, these polymers are also included in the category of the above mentioned acid anhydride containing water-soluble polymers. Such neutralizing agents include ammonia water, sodium hydroxide, methylamine, ethylamine, sodium acetate, disodium hydrogenphosphate, urea, formaldehyde, and the like. Addition amount of such neutralizing agents varies depending upon degree of dissociation of acid anhydrides of the above polymers. It is desired that neutralizing agents are added to keep pH of the water phase within a range of 3 to 12, preferably 4 to 11.

Addition amount of the tertiary amine compound and the acid anhydride containing water-soluble polymer is not specifically limited. Since these components are usually polymers, the more the addition amount is, the greater the thickening effect is. Since dispersants, in such case, only have to be added in a minimum amount to finely and stably disperse the water-insoluble colorant in water, it is preferred that the addition amount is appropriately determined depending upon kinds of dispersants.

As required, the water phase may further contain other water soluble additives such as wetting agents, electrolytes, antifungal agents, antioxidants, water evaporation inhibiting agents and the like.

The present W/O emulsion ink can readily be made, for example, by gradually adding 90 to 30% by weight of the above mentioned water phase to 10 to 70% by weight of the above mentioned oil phase to emulsify the mixture.

EXAMPLES

Hereinafter, the present invention will be explained in more detail by way of presently preferred working examples. However, it should be understood that the present invention is not limited to the examples. In the following examples, the term "part(s)" means "part(s) by weight" unless otherwise indicated.

Example 1

A W/O emulsion ink was prepared in accordance with the formulation shown in Table 1 and the following procedure. First, ion-exchanged water, ethylene glycol, furnace carbon black and polyvinyl pyrrolidone (Luviskol K17 (trade name) manufactured by BASF) are mixed together and stirred thoroughly, and the components were dispersed using a bead mill. An emulsion type polyacrylic acid ester was added to the obtained dispersed-solution, and the mixture was again stirred to obtain a water phase.

Then, an oil phase was prepared by thoroughly mixing rosin-modified phenolic resin, #40 motor oil, No.5 solvent manufactured by Nippon Oil Co. Ltd. and sorbitan monooleate under stirring. The water phase was gradually added to the oil phase and emulsified using a stirrer to obtain an emulsion ink for stencil printing.

Meanwhile, viscosity of each oil phase shown in Table 1 was measured at 23° C. by use of a controlled rate rheometer CV-1D manufactured by HAAKE Corp. before the oil phase that had been prepared as above was mixed with the water phase.

Examples 2 to 7

Emulsion inks for stencil printing were prepared in the same manner as in Example 1 in accordance with the formulations shown in Table 1.

Example 8

An emulsion ink for stencil printing was prepared in the same manner as in Example 1, except that the oil phase was prepared by mixing and dispersing #40 motor oil, No.5 solvent manufactured by Nippon Oil Co. Ltd., sorbitan monooleate and hydrophobic silica by use of a mill having three rollers.

TABLE 1

Formulations of W/O emulsion inks (parts by weight)

| Number of Examples | 1 | 2 | 3 | 4 | 5 | 6 | 7 | 8 |
|---|---|---|---|---|---|---|---|---|
| Oil phase: | | | | | | | | |
| Non-volatile solvent: #40 Motor oil | 9.0 | 8.5 | 8.0 | 10.0 | 2.0 | 6.0 | 6.0 | 10.0 |
| Volatile solvent: No. 5 solvent (manufactured by Nippon Oil Co. Ltd.) | 3.0 | 3.0 | 3.0 | 3.0 | 14.0 | 8.5 | 8.5 | 5.0 |
| Emulsifier: Sorbitan monooleate | 2.0 | 2.0 | 2.0 | 2.0 | 2.0 | 2.0 | 2.0 | 2.0 |
| Resin: Rosin modified phenolic resin | 4.0 | — | — | — | — | — | — | — |
| Petroleum resin | — | 4.5 | — | — | — | — | — | — |
| Alkyd resin | — | — | 5.0 | — | 5.0 | 15.0 | 25.0 | — |
| Maleic resin | — | — | — | 3.0 | — | — | — | — |
| Oil-insoluble powder: Hydrophobic silica | — | — | — | — | — | — | — | 1.0 |
| Viscosity (cps)*1 | 120 | 180 | 150 | 85 | 36 | 1950 | 18500 | 1850 |
| Water-insoluble colorant: furnace carbon black*2 | 4.0 (0.2) | 4.0 (0.2) | 4.0 (0.2) | 4.0 (0.2) | 4.0 (0.2) | 4.0 (0.2) | 4.0 (0.2) | 4.0 (0.2) |
| Water phase: | | | | | | | | |
| Water: ion-exchanged water | 66.0 | 66.0 | 66.0 | 66.0 | 61.0 | 52.5 | 42.5 | 66.0 |
| Dispersant: polyvinyl pyrrolidone | 1.0 | 1.0 | 1.0 | 1.0 | 1.0 | 1.0 | 1.0 | 1.0 |
| O/W emulsion of resin: polyacrylic acid ester (solid content 50%) | 5.0 | 5.0 | 5.0 | 5.0 | 5.0 | 5.0 | 5.0 | 5.0 |
| Wetting agent: Ethylene glycol | 6.0 | 6.0 | 6.0 | 6.0 | 6.0 | 6.0 | 6.0 | 6.0 |

*1: Viscosity is indicated as a value at 200 (1/s).
*2: Values in parentheses show average particle sizes (μm).

Comparative Examples 1 and 2

Emulsion inks for stencil printing were prepared in the same manner as in Example 1 in accordance with the formulations shown in Table 2.

Comparative Example 3

A W/O emulsion ink was prepared in accordance with the formulation shown in Table 2 and the following procedure. First, an oil phase was prepared by thoroughly mixing alkyd resin, furnace carbon black, #40 motor oil, No.5 solvent manufactured by Nippon Oil Co. Ltd. and sorbitan monooleate, and thoroughly kneading the mixture by use of a mill having three rollers. Then, an emulsion ink for stencil printing was obtained by gradually adding a mixed solution of ion-exchanged water and ethylene glycol to the oil phase and emulsifying it by use of a stirrer.

TABLE 2

Formulations of W/O emulsion inks (parts by weight)

| Number of Comparative Examples | 1 | 2 | 3 |
|---|---|---|---|
| Oil phase: | | | |
| Non-volatile solvent: #40 Motor oil | — | — | 11.0 |
| Volatile solvent: No. 5 solvent (manufactured by Nippon Oil Co. Ltd.) | 15.0 | — | 3.0 |
| Emulsifier: Sorbitan monooleate | 5.0 | 2.0 | 2.0 |
| Resin: Rosin modified phenolic resin | — | — | — |
| Petroleum resin | — | — | — |
| Alkyd resin | — | 35.0 | 7.0 |
| Maleic resin | — | — | — |
| Oil-insoluble powder: Hydrophobic silica | — | — | — |
| Viscosity (cps)*1 | 0.75 | 22000 | — |
| Water-insoluble colorant: furnace carbon black*2 | 7.0 (0.2) | 4.0 (0.2) | 4.0 (0.3) |
| Water phase: | | | |
| Water: ion-exchanged water | 63.5 | 47.0 | 67.0 |
| Dispersant: polyvinyl pyrrolidone | 1.5 | 1.0 | — |
| O/W emulsion of resin: polyacrylic acid ester (solid content 50%) | 2.0 | 5.0 | — |
| Wetting agent: Ethylene glycol | 6.0 | 6.0 | 6.0 |

*1: Viscosity is indicated as a value at 200 (1/s).
*2: Values in parentheses show average particle sizes (μm).

Performance Tests

Stencil printing was effected by use of a stencil printing apparatus RISOGRAPH (registered trademark) GR375 (manufactured by RISO KAGAKU CORPORATION) with each of the inks prepared in Examples 1 to 8 and Comparative Examples 1 to 3. Emulsion stability of these emulsion inks as well as printing density, seep through, blurring and set-off of prints thus obtained were determined in accordance with the following procedures (1)–(5), and the results are shown in Table 3.

(1) Stability: After the ink was left at 70° C. for three months, destruction of the ink was observed with naked eyes. When destruction of emulsion of the ink did not occur, the result was shown as (+) in Table 3. When destruction of emulsion of the ink occurred, the result was shown as (−) in Table 3.

(2) Printing density: Printing density on a solid region of the print was measured using a reflection density measuring apparatus RD920 manufactured by Macbeth Corp.

(3) Seep through: Printing density on the side opposite to the solid region of the print was measured by the same reflection density measuring apparatus as in (2).

(4) Blurring: Blurring around the ink of the print was observed by use of a microscope of 80 times magnification. When little blurring was observed, the result was indicated as (−) in Table 3. When blurring was conspicuous, the result was indicated as (+) in Table 3.

(5) Set-off: After 50 prints were continuously printed and stacked, the back sides of the prints were observed. When there was no set-off, the result was indicated as (−) in Table 3. When there was set-off, the result was indicated as (+) in Table 3.

TABLE 3

Results of Examples and Comparative Examples

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Stability | (+) | (+) | (+) | (+) | (+) | (+) | (+) | (+) |
| Printing Density | 1.17 | 1.16 | 1.20 | 1.21 | 1.22 | 1.11 | 0.95 | 1.12 |
| Seep through | 0.15 | 0.11 | 0.15 | 0.14 | 0.15 | 0.11 | 0.09 | 0.11 |
| Blurring | (−) | (−) | (−) | (−) | (−) | (−) | (−) | (−) |
| Set-off | (−) | (−) | (−) | (−) | (−) | (−) | (−) | (−) |

|  | C. Ex. 1 | C. Ex. 2 | C. Ex. 3 |
|---|---|---|---|
| Stability | (−) | (+) | (+) |
| Printing Density | 1.15 | 0.81 | 1.01 |
| Seep through | 0.19 | 0.09 | 0.22 |
| Blurring | (+) | (−) | (+) |
| Set-off | (−) | (−) | (+) |

Note: "Ex." refers to Example.
Note: "C. Ex." refers to Comparative Example.

From Table 3, it is understood that Examples 1 to 8 were superior in emulsion stability to Comparative Example 1, and were higher in printing density, seep through and blurring than Comparative Example 2. Also, it is found that Examples 1 to 8 were lower in blurring and set-off and higher in printing density than Comparative Example 3.

Since the present W/O emulsion ink contains water-insoluble colorants in water phase, it provides high printing density, and can be dried without seep through or blurring. In addition, since the present emulsion ink contains a thickening agent composed of resins, oil-insoluble powders or particulates and the like, it is excellent in emulsion stability.

We claim:

1. A water-in-oil (W/O) stencil printing emulsion ink, having an oil phase and a water phase, in which a water-insoluble colorant is contained in said water phase, and said oil phase comprises a solvent and an agent for thickening said solvent.

2. A stencil printing emulsion ink according to claim 1, in which said oil phase has a viscosity of 5–20,000 cps at 23° C.

3. A stencil printing emulsion ink according to claim 2, in which said oil phase has a viscosity of 15–2,000 cps at 23° C.

4. A stencil printing emulsion ink according to claim 1, in which said agent for thickening said solvent is a resin.

5. A stencil printing emulsion ink to claim 4, in which said resin is contained in an amount of 1–30% by weight based on the total of the ink.

6. A stencil printing emulsion ink according to claim 5, in which said resin is contained in an amount of 2–25% by weight based on the total of the ink.

7. A stencil printing emulsion ink according to claim 1, in which said agent for thickening said solvent is oil-insoluble particulates or powders.

8. A stencil printing emulsion ink for stencil printing according to claim 7, in which said oil-insoluble particulates or powders are contained in an amount of 0.01–10% by weight based on the total of the ink.

9. An emulsion ink for stencil printing according to claim 8, in which said oil-insoluble particulates or powders are contained in an amount of 0.1–5% by weight based on the total of the ink.

10. A stencil printing ink comprising a water-in-oil (W/O) emulsion ink which has an oil phase and a water phase, wherein said oil phase has a viscosity of 5–20,000 cps at 23° C. said oil phase comprising a solvent and thickening agent for said solvent, and wherein said water phase at least one water-insoluble colorant is stablely dispersed therein.

11. A stencil printing ink according to claim 10, wherein said water-insoluble colorant is present in an amount of 1–30% by weight based on a total weight of said water-in-oil (W/O) emulsion ink.

12. A stencil printing ink according to claim 10, wherein said water-insoluble colorant is present in an amount of 3–10%.

13. A stencil printing ink according to claim 10, wherein said water insoluble colorants are dispersed in said water phase with at least one tertiary amine compound.

14. A stencil printing ink according to claim 10, wherein said water insoluble colorants are dispersed in said water phase with at least one acid anhydride-containing water-soluble polymer having, in the polymer, at least one functional group represented by the following formula:

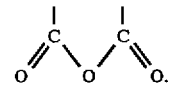

15. A stencil printing ink according to claim 10, wherein in which said oil phase has a viscosity of 15–2,000 cps at 23° C.

16. A stencil printing ink according to claim 10, wherein said agent for thickening said solvent is a resin.

17. A stencil printing ink according to claim 10, wherein said resin is present in an amount of 1–30% by weight based on a total weight of the ink.

18. A stencil printing ink according to claim 10, wherein said resin is present in an amount of 2–25% by weight based on a total weight of the ink.

19. A stencil printing ink according to claim 10, wherein said agent for thickening said solvent is at least one oil-insoluble particulate or powder.

20. A stencil printing ink according to claim 10, wherein said oil-insoluble particulate or powder is present in an amount of 0.01–10% by weight based on a total weight of said stencil printing ink.

* * * * *